Patented Jan. 30, 1934

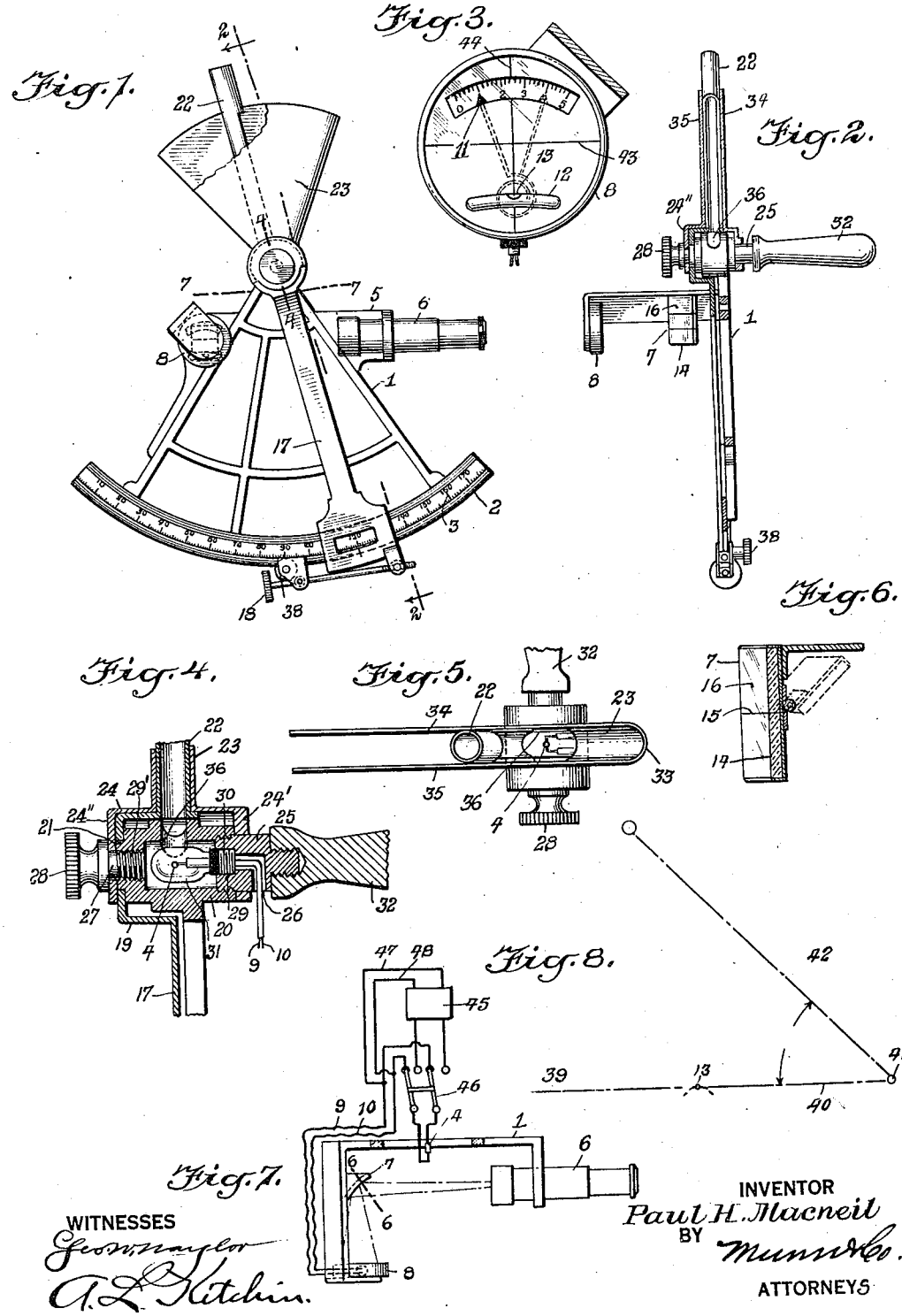
Jan. 30, 1934.     P. H. MACNEIL     1,944,897
ANGLE DETERMINING INSTRUMENT
Filed Nov. 24, 1930     2 Sheets-Sheet 1
INVENTOR
Paul H. Macneil
BY Munn & Co.
ATTORNEYS

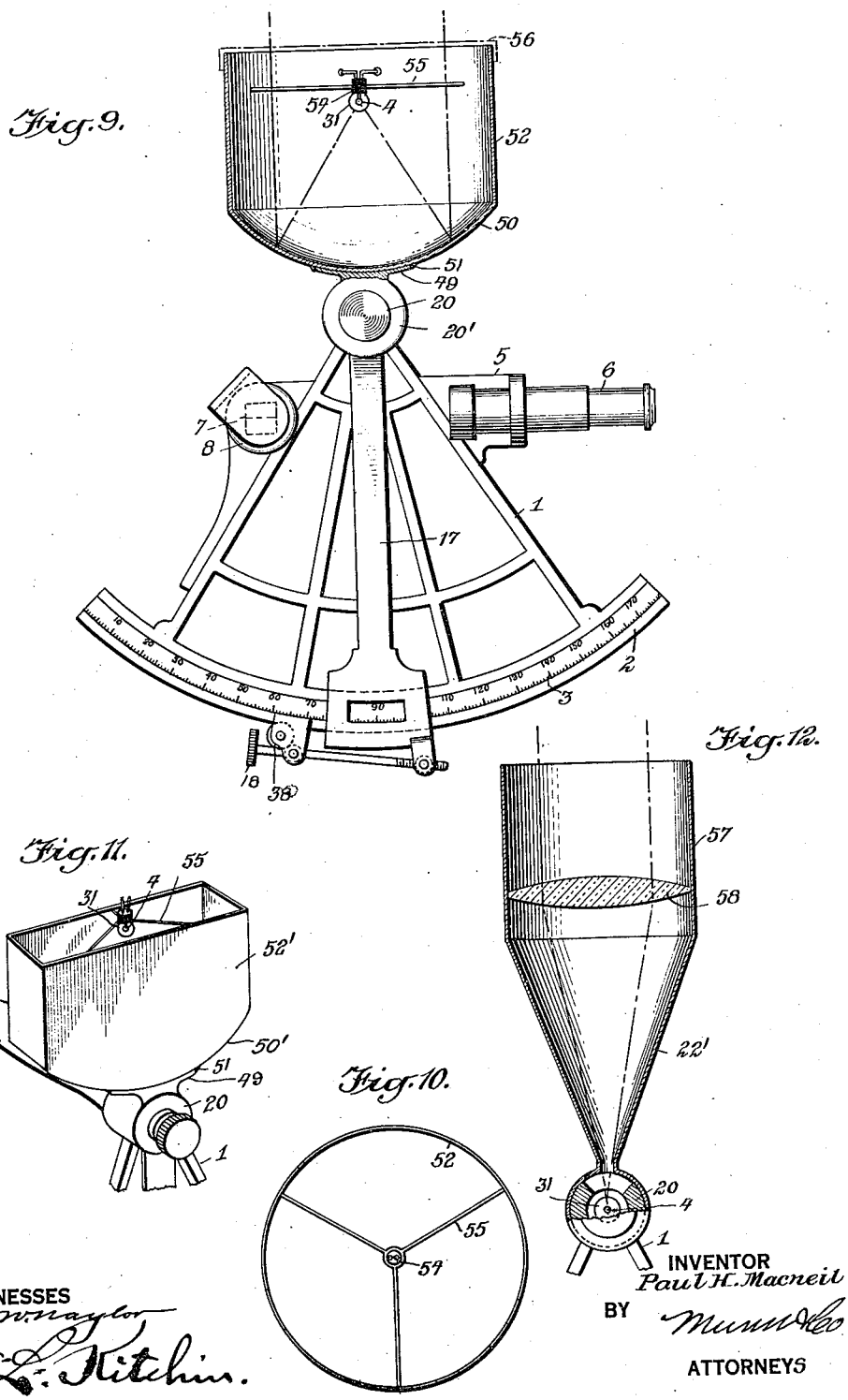

1,944,897

UNITED STATES PATENT OFFICE 1,944,897

ANGLE DETERMINING INSTRUMENT

Paul H. Macneil, Huntington, N. Y.

Application November 24, 1930
Serial No. 497,922

18 Claims. (Cl. 88—1)

This invention relates to an angle-determining instrument which may be formed as a sextant, an octagant, a quadrant, or similar device, and used substantially in the same way except that the device is generally used as a device responsive to heat rather than to light.

An object of the invention is to provide an improved simplified construction wherein the angle of the sun or other object in respect to the horizon or other fixed line may be secured in a fog or at times when the object cannot be seen.

Another object of the invention is to provide an instrument of the nature of a sextant, quadrant or the like which may be used to secure the angle between the sun and the horizon either while the sun is shining or when it is obscured by a cloud or fog.

A still further object, more specifically, is to provide an angle-determining instrument wherein means are provided to determine the line of the sun or other heat object and then determine exactly the angle thereof from the horizontal.

In the accompanying drawings—

Figure 1 is a side view of an instrument disclosing an embodiment of the invention;

Figure 2 is a sectional view through Figure 1 approximately on the line 2—2;

Figure 3 is an enlarged side view of a device responsive to magnetic influences, the same being the galvanometer type of device;

Figure 4 is an enlarged fragmentary sectional view through Figure 1 approximately on the line 4—4;

Figure 5 is a top plan view of the device shown in Figure 1, the same being on an enlarged scale and the lower part being eliminated;

Figure 6 is an enlarged fragmentary sectional view through Figure 7 on the line 6—6;

Figure 7 is a fragmentary sectional view through Figure 1 on the line 7—7 with the swinging arm removed and the wiring shown in diagram;

Figure 8 is a diagram indicating how the instrument is used in securing the angle of the sun from the horizon;

Figure 9 is a view similar to Figure 1 but showing a modified form of the invention, the upper part being shown in section;

Figure 10 is a top plan view of the upper part of the structure shown in Figure 9;

Figure 11 is a detailed fragmentary perspective view of a modified form of the structure shown in Figure 9;

Figure 12 is a fragmentary view showing the hub and associated parts of Figure 1 with a modified form of tube arm.

Referring to the accompanying drawings by numerals, 1 indicates a frame which is shown in Figure 1 as the usual frame commonly provided in sextants, said frame carrying an arc bar 2 having graduations 3 thereon of the usual type.

The present invention may be constructed as a sextant as shown in the accompanying drawings, although it may have a greater or less angle as desired. The instrument shown in Figure 1 may be used as an ordinary sextant to secure the angle of the sun while the sun is shining brightly, but it is preferably designed to be used when the sun is obscured by fog. When used in a fog the same is arranged as shown in Figure 1, but when used when the sun is shining some form of protection must be provided for the thermo-couple 4, said protection being a colored glass or other article which will permit a certain amount of heat waves to penetrate but not enough to injure the thermo-couple or other infra-red ray detector. It will be understood that the word "detector" in the present specification is intended to indicate any infra-red ray detector, such as a thermo-couple, photoelectric cell or other heat responsive device which will produce an electric current, or vary resistance to passage of electric current.

As shown in Figure 1 of the drawings, the frame 1 is provided with a bracket 5 carrying a telescope 6 which may be of the usual kind, said telescope being directed toward a mirror 7, which in turn reflects the face of the meter or magnetic responsive device 8, said device being in the nature of an ammeter, voltmeter or galvanometer responsive to minute currents as, for instance, a current equal to one-millionth of a volt or slightly more. The thermo-couple is connected through wires 9 and 10 (Figure 7) to the windings of the indicator 8. The term "indicator" in the specification will mean a voltmeter, an ammeter, a galvanometer or other device which is responsive to current of one-millionth of a volt or more. When heat is applied, or rather when the detector 4 is subjected to heat, current will be generated which will act on the indicator 8 and cause the pointer 11 to move, for instance, to the position shown in Figure 3, although a greater amount of current will naturally cause it to move further. When looking through the telescope 6 the entire face of the indicator 8 will be seen so that the movement of the pointer 11 may be watched. In addition, the indicator carries a level 12 which may be seen at all times, said level being positioned so that the bubble 13 will indicate when the instrument is level, and consequently will indicate the horizon in case the horizon cannot be seen.

Where the horizon can be seen the lower half 14 (Fig. 6) of the mirror 7 will be swung rearwardly out of the way, and consequently a person looking through the telescope 6 may see the horizon and may move the instrument so that the lower line 15 of the upper section 16 of the mirror 7 will be parallel to the horizon, or exactly resting on the horizon.

As seen in Fig. 3, line 43 is provided centrally of the indicator and when part 14 of the mirror is moved to the dotted position shown in Fig. 6, line 15 of the mirror is preferably brought into exact registry with line 43. Where the artificial horizon is used, namely, the bubble 13, the same is brought into proper registry with the vertical line 44 on the indicator 8.

Associated with frame 1 is the usual moving arm 17 which coacts with the arc bar 2 and, if desired, may be provided with the usual tangent screw 18 to secure a fine adjustment. Arm 17, as shown in Fig. 4, is provided with what may be termed an auxiliary hub 19 telescopically fitting over hub 20 of frame 1. Hub 20 is provided with a reduced portion 21, and the end of auxiliary hub 19 is provided with an aperture so that the parts will fit snugly together, as shown in Fig. 4, but sufficiently loose to allow a swinging movement of the hub 19 when arm 17 moves. An arm tube 22 is formed integral with the auxiliary hub 19 or rigidly secured thereto, and extends upwardly a desired distance. This tube is cut away from the auxiliary hub 19 upwardly to almost its full length, while the extreme upper end is left in its tubular form.

Associated with and surrounding the arm tube 22 is a heat shield 23. Shield 23 is U-shaped in form for its entire distance except at one point where it is formed into a hub surrounding part of the auxiliary hub 19 and part of the hub 20.

As shown in Figure 4, the plug 25 is screwed into one end of hub 20, which hub is hollow for most of its length, said plug being provided with an L-shaped passageway 26, as shown in Fig. 4, but it may be some other shape without departing from the spirit of the invention. The end 24' surrounding the plug 25 is journaled thereon, while the end 24" of hub 24 surrounds and is journaled on a screw 27, which screw has a thumb member 28 and a threaded portion 29', said threaded portion being screwed into the threaded end of hub 20. In this way the screw acts to clamp the end 24" against the hub 20 and also against the auxiliary hub 19, whereby the shield 23 is either locked rigidly in position or is held frictionally in any position in which it may be placed. The plug 25 is provided with a threaded portion 29 which receives the threaded end 30 of the vacuum tube 31 carrying the detector 4. Wires 9 and 10 extend through the threaded end 30 into the tube 31 and also to the indicator 8. The handle 32 is screwed on to plug 25, said handle acting as means whereby it may support the instrument when in use. Preferably the shield 23 is open at one edge but closed at edge 33, as shown in Fig. 5.

In operation, when there is a fog and a person wishes to secure the angle of the sun or any other body providing an appreciable amount of heat as, for instance, the moon, the instrument is grasped by the handle 32 and used substantially as an ordinary sextant, but instead of using the light of the sun or other celestial body, the instrument is moved and shifted to secure heat in a direct line from the body whose angle is being measured. At the beginning of the observation the shield 23 is moved to the position shown in Fig. 1, or further over so that the closed end 33 will be an appreciable distance away from the arm tube 22. This will allow heat from the sun to pass directly downwardly between the respective walls 34 and 35, and from thence through the opening or slot 36 in hub 20, whereupon the heat will affect the detector 4.

As soon as this occurs the pointer 11 will move away from zero, as shown in Fig. 3, in a direction toward the right. The instrument is then tilted back and forth until the observer is confident that the sun is shining directly between the walls 34 and 35 of the shield 23. When this occurs he will push the shield to the left, as shown in Fig. 1, until the closed edge 33 engages the tube arm 22, whereupon the cut-away portion will be closed and a substantially tube form is secured. The arm 17 is then moved back and forth as desired until the maximum heat is secured through the arm 22. If the maximum heat is at the first graduation, as shown in Fig. 3, the pointer 11 will naturally move over to that portion. In moving the arm 17 the same will be moved back and forth so that the pointer 11 will sometimes be at the first graduation and sometimes will fall short thereof, thus indicating that the maximum heat is being received when the pointer 11 is at the first graduation. As soon as this has been determined the observer will level the instrument by aligning the lower edge of section 16 of mirror 7 with the horizon if the same can be seen.

If the horizon cannot be seen then the instrument must be leveled by the use of the level 12 and the action of bubble 13. If during the leveling operation the pointer 11 moves away from its maximum position then the instrument must be again adjusted until it moves back to its maximum position. When the pointer 11 is at its maximum position and the instrument is level the correct angle has been secured which will be indicated on the arc bar 2. When this occurs the clamping screw 38 is tightened so as to lock arm 17 against movement.

When the artificial horizon is used, namely, the level 12, the height of the observer above the water or the land must be taken into consideration when using the angle secured. When the observer uses the natural horizon there is a double angle toward the horizon from the observer's eye and the measurement of the sun or other object is therefore from its downward angle upwardly to the angle of the sun, whereas on an artificial horizon the angle is what is known as horizontal.

The angle shown in Fig. 1 is 110, but it will be evident that the correct angle from the horizontal will be secured because the arm 17 and the arm 22 are in exact alignment, and if the parts are accurately made the exact angle between the sun and the horizon will be secured, as illustrated in Fig. 8. In this figure the point 39 is to indicate the horizon which will naturally give a horizontal line 40 to the observer. The line 42 is the angle of the arm 17 and the arm 22 as it points towards the sun. This will give the correct angle which will be disclosed in proper figures on the arc bar 2.

As shown in Fig. 7, in case the infra-red rays secured or caused to act on the detector are not sufficient to produce sufficient current to appreciably actuate the indicator 8, a booster or relay may be used. As shown in Fig. 7, the numeral 45 indicates the relay or booster and the same is adapted to be switched into the circuit of the detector and the indicator by being plugged into suitable sockets or by having a switch 46, as shown in the drawings. When the switch is positioned as shown in the drawings, the current produced directly by the infra-red rays are used, but when moved to the right, the maximum current produced by the detector will act as a primary in connection with the relay 45. Consequently the current flowing through the wires 47 and 48 will partake of the same nature as the current in the primary but will be much stronger and, consequently, will operate the indicator 8 in a desirable way, the operation being, of course, in exact proportion to the action of the detector 4.

Instead of using the direct infra-red rays from the sun, moon or other body, as shown in Fig. 1, means may be provided for directing a number of rays over a wide area to the detector. In Figs. 9 to 12 two forms of devices are disclosed to accomplish this purpose. In the form shown in Figs. 9 and 11 a reflector is used for centering the rays on the detector, while in Fig. 12 a lens is used so that the rays are focussed by refraction. Referring more particularly to Figs. 9 and 10, it will be noted that frame 1 and associated parts are identical with that shown in Fig. 1, the difference being in the structure above the hub 20.

In this form of the invention the arm 17 is provided with an auxiliary hub 20' which rocks on the hub 20. Hub 20 in this form of the invention is preferably solid and hub 20' is merely a sleeve which seats thereover. Hub 20' is provided with an enlarged support 49 which may be secured to the reflector 50 in any desired manner, for example, by solder 51. Reflector 50 may be of metal, glass or other material but preferably a desired kind of metal reflector is used. As infra-red rays are being used it is desired to use a reflector which will absorb as few of these rays as possible but will deflect or reflect these rays along certain lines so that they will be substantially centered on the detector 4. While different forms of curved reflectors may be used it has been found that a parabolic reflector is the most desirable as it centers the rays in a very efficient manner with practically no loss. Connected with the reflector 50 is a tubular member 52 which acts as a casing to prevent stray rays from entering from the side, so that practically the only rays striking the reflector 50 will be the direct rays from the sun or other object being observed.

As shown in Fig. 9, the detector 4 is supported at the focal point of the reflector or substantially at such point, which is near the outer edge of the casing 52. The detector 4 may be supported in any desired manner preferably by one or more small rods 55 secured in any desired manner to the casing and presenting a hub 54 into which the shank of the vacuum tube 31 may be screwed. The wires from the detector lead off in any desired manner through the casing 52. These wires are connected to the indicator 8 as heretofore described, so that the parts will function exactly as in the structure shown in Fig. 1, except as above described.

In the accompanying drawings the reflector 50 has been shown of a certain size, but it will be evident that the same may be made larger or smaller without departing from the spirit of the invention. If desired, a closure cap 56 may be used when the device is not in operation. In Figure 11 the same structure shown in Fig. 9 is disclosed, except that the mirror 50' is merely a section taken from the reflector 50. Other parts of the mirror may be taken and used in a similar manner to that shown in Fig. 11 without departing from the spirit of the invention. Preferably the side walls of the casing 52' are used with these sections so that only the direct rays striking the reflector will be focussed on the detector 4.

In Fig. 12 another form of focussing the heat or infra-red rays onto the detector is disclosed. In this form the structure shown in Fig. 1 is used except that instead of having the shield 23 and tube arm 22, a tube arm 22' is used which is of a desired shape so that the upper end will present a comparatively large tubular casing 57. In this casing is mounted a lens 58 which will focus the rays striking the same so that they will all strike the detector 4. Expressed in another way, the lens is so formed and positioned in connection with the detector that the detector is located at the focal point of the lens and, consequently, all of the rays passing through the lens will strike the detector. By using the structure shown in Fig. 9, or that shown in Fig. 12, a large number of rays may be centered onto the detector. This is desirable in many instances, especially where the fog is very thick and very deep. Where the fog is of less depth the simple tube arm 22 shown in Fig. 1 may be utilized with advantage.

It will be understood that although the details shown in the drawings have been described in order to show one practical form of the invention, which is the best form shown to the applicant, it will be evident that many of the details may be changed without changing the principle or function of the device.

I claim—

1. An angle determining instrument including a frame provided with an arc bar having degrees marked thereon, a swinging arm coacting with said arc bar, said arm having a tubular extension, and a heat detector arranged coincident with the pivotal center of the arm and in alignment with the tubular extension whereby when the arm is pointing towards a body radiating heat said detector will be made active, and means connected to the detector for indicating the activity thereof.

2. An instrument for measuring the angular distance between the horizon and the sun when the sun is obscured by fog, clouds and the like, including an infra-red ray detector, a swinging arm, tubular means extending axially from said swinging arm, said tubular means extending towards said detector whereby heat rays passing through said tubular means will affect said detector, magnetically actuated means connected with said detector for indicating whenever a maximum number of rays are passing through said tubular means, means for indicating when said arm and said tubular means are in a vertical plane, and means coacting with said arm for indicating the angle of the arm and tubular means from the horizontal.

3. An instrument for measuring the angular distance between the horizon and the sun when the sun is obscured by fog, clouds and the like, including an infra-red ray detector, means for indicating when the detector is functioning at maximum, a member rotatable about the detector so as to be positioned parallel to the rays striking the detector, means for positioning the vertical axis of the instrument at right angles to the horizontal and means for indicating the angle of said swinging member from the horizontal.

4. An instrument for measuring the angular distance between the horizon and the sun when the sun is obscured by fog, clouds and the like, including an infra-red ray detector, a tubular member movable with respect to said detector through which said rays are adapted to pass, means for indicating when said tubular member is positioned to permit a maximum number of rays to strike said detector, and means for indicating the angle of said tubular member from the horizontal.

5. An instrument for measuring the angular distance between the horizon and the sun when the sun is obscured by fog, clouds and the like, including a relatively fixed infra-red ray detector, a heat shield for said detector movable with respect thereto including a structure having an aperture through which rays from the sun are adapted to strike said detector, means for indicating when said shield is positioned to permit a maximum number of rays to strike said detector, and means for indicating the angle from the horizontal of said rays.

6. An angle-determining instrument comprising a support having a graduated scale, a pointer arm and a tubular extension pivotally mounted on the support so that the pointer arm cooperates with said scale, a heat sensitive device attached to said support so as to be in alignment with said tubular extension, and an indicating device connected to said heat sensitive device.

7. An angle-determining instrument comprising a support having a graduated scale, a pointer arm and a tubular extension pivotally mounted on the support so that the pointer arm cooperates with said scale, a heat sensitive device attached to said support so as to be in alignment with said tubular extension, an indicating device connected to said heat sensitive device, and means associated with said tube for collecting and directing heat waves onto said heat sensitive device.

8. An instrument as described comprising a supporting frame, a heat sensitive device fixed on the support, means for collecting and concentrating heat waves onto said device, said means being oscillatable about the heat sensitive device as a center, indicating means connected to the heat sensitive device for indicating the degree of excitation of the heat sensitive device under influence of heat waves, and means including a pointer arm movable with said collecting and concentrating means for indicating the direction of the heat source with respect to a reference datum.

9. An instrument as described comprising a supporting structure, a tube and a longitudinally extending arm pivotally mounted on said structure for conjoint movement, a heat sensitive device mounted on said structure and arranged to receive heat radiations through said tube, an indicating device associated with said heat sensitive device, means on said structure indicating when it is in a vertical plane with its vertical axis at right angles to the horizontal, and a scale cooperating with said arm.

10. An instrument as described comprising a supporting frame having a graduated scale thereon, a heat sensitive device mounted on said frame, an indicating device mounted on said frame and operatively connected to said heat sensitive device and having a reference line thereon, movable means for concentrating heat waves on said heat sensitive device, means cooperating with the concentrating means and said scale for measuring the angle of the concentrating means with the horizontal, and viewing means mounted on said frame for simultaneously observing the indicator, said reference line and the horizon.

11. An instrument as described comprising a supporting frame having a graduated scale thereon, a heat sensitive device mounted on said frame, an indicating device mounted on said frame and controlled by said heat sensitive device and having a reference line thereon, oscillatable means for concentrating heat waves on said heat sensitive device, means cooperating with the concentrating means and said scale for measuring the angle of the concentrating means with the horizontal, viewing means mounted on said frame for simultaneously observing the indicator, said reference line and the horizon, and leveling means mounted on the indicator.

12. An instrument as described comprising a frame having a graduated scale thereon, a heat sensitive device, means for concentrating heat waves onto said device, said means being pivotally mounted on the frame, an arm movable with said concentrating means and cooperating with said scale, means for indicating the activity of the detector and mounted on said frame, leveling means and viewing means mounted on said frame, so that the indicating means and the leveling means can be simultaneously observed.

13. An angle-determining instrument comprising means for determining the angle of the sun from the horizon when the sun is obscured by fog, clouds or the like, said means including an infra-red ray detector, an arm provided with means for shutting off all rays from the sun except direct rays and movable about the axis of said detector, means operated by said detector for indicating when said arm is positioned to permit a maximum number of direct rays to strike said detector, and means cooperating with said arm for indicating the angle thereof from the horizontal.

14. In an instrument for measuring the angular distance between the horizon and the sun when the sun is obscured by fog, clouds and the like, including a support, an infra-red ray reflector pivotally mounted on said support, an arm pivotally mounted on said support and movable with said reflector, an indicating scale mounted on said support so that said arm is movable thereover, an infra-red ray detector mounted at the focal point of said reflector and movable therewith, means mounted on said support for indicating when it lies in a vertical plane, and means connected to said detector for indicating the activity thereof, said scale indicating the vertical angle with respect to the horizontal of the rays striking said detector when the indicating means shows maximum activity of the detector.

15. In an instrument for measuring the angular distance between the horizon and the sun when the sun is obscured by fog, clouds and the like, including a support, an infra-red ray reflector pivotally mounted on said support, an arm pivotally mounted on said support and movable with said reflector, an indicating scale mounted on said support so that said arm is movable thereover, an infra-red ray detector mounted at the focal point of said reflector and movable therewith, means mounted on said support for indicating when it lies in a vertical plane, means connected to said detector for indicating the activity thereof, said scale indicating the vertical angle with respect to the horizontal of the rays striking said detector when the indicating means shows maximum activity of the detector, and a shield surrounding said reflector and detector to cut off all rays except those normal to the reflector.

16. An instrument as described comprising a frame having a graduated scale, heat wave collecting and concentrating means, a pointer cooperating with said scale, said collecting means and said pointer being pivotally mounted to move as a unit on said frame, a heat sensitive device mounted at the pivot point of said means, and an indicating device connected to said heat sensitive device.

17. An instrument as described comprising a frame having a graduated scale, heat wave collecting and concentrating means, a pointer cooperating with said scale, said collecting means and said pointer being pivotally mounted to move as a unit on said frame, a heat sensitive device mounted at the pivot point of said means, an indicating device connected to said heat sensitive device and mounted on said frame, and telescopic means mounted on said frame for viewing said indicating device.

18. An instrument as described comprising a frame having a graduated scale, heat wave collecting and concentrating means, a pointer cooperating with said scale, said collecting means and said pointer being pivotally mounted on said frame to move as a unit, a heat sensitive device mounted at the pivot point of said means, an indicating device connected to said heat sensitive device and mounted on said frame, telescopic means mounted on said frame for viewing said indicating device, and leveling means for effecting coincidence of the vertical axis of the instrument with the true vertical.

PAUL H. MACNEIL.